United States Patent

[11] 3,634,699

[72] Inventor Melvin R. Cox
Jackson, Tenn.
[21] Appl. No. 16,105
[22] Filed Mar. 3, 1970
[45] Patented Jan. 11, 1972
[73] Assignee Owens-Corning Fiberglas Corporation

[54] CONDITION-RESPONSIVE CONTROL CIRCUIT
18 Claims, 2 Drawing Figs.
[52] U.S. Cl................................................ 307/118,
317/DIG. 3, 340/244 A
[51] Int. Cl................................................ H01h 35/18
[50] Field of Search........................................ 307/118,
279, 109, 304; 317/123 PL; 328/1; 340/244 A,
244 B, 244 C; 320/1; 137/392, 412

[56] References Cited
UNITED STATES PATENTS
2,946,991 7/1960 Lindberg..................... 340/244
2,968,181 1/1961 Mittelmann.................. 340/244 X
3,412,292 11/1968 Forbes........................ 317/DIG. 3
3,438,189 4/1969 Gasser et al................. 307/304 X
3,527,961 9/1970 Palini......................... 307/304 X

*Primary Examiner*—Robert K. Schaefer
*Assistant Examiner*—William J. Smith
*Attorneys*—Staelin & Overman and Oliver E. Todd, Jr.

ABSTRACT: Apparatus for generating a signal for controlling a condition, such as liquid level, which may fall above, within or below a predetermined tolerance range. One of two switches is closed when the condition is out of tolerance in one direction and the other switch is closed when the condition is out of tolerance in the other direction. Closure of one switch charges a capacitor, while closure of the other switch discharges the capacitor. The state of charge on the capacitor, which is dependent upon the time and the direction in which the condition is out of tolerance, is maintained constant when both switches are open. The charge on the capacitor is applied to the gate of a field-effect transistor, which generates a control signal for bringing the condition within the tolerance range. The apparatus is particularly suitable for controlling the level of a pool of molten glass in an orificed feeder for forming glass fibers or filaments.

PATENTED JAN 11 1972
3,634,699
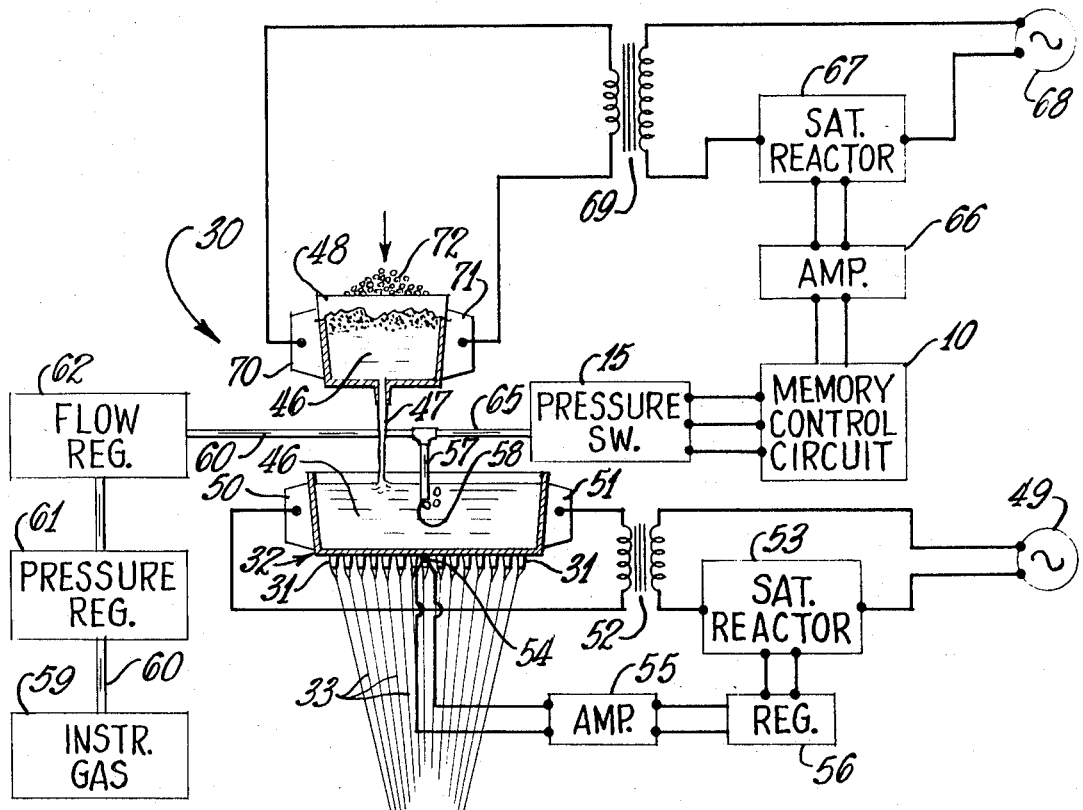
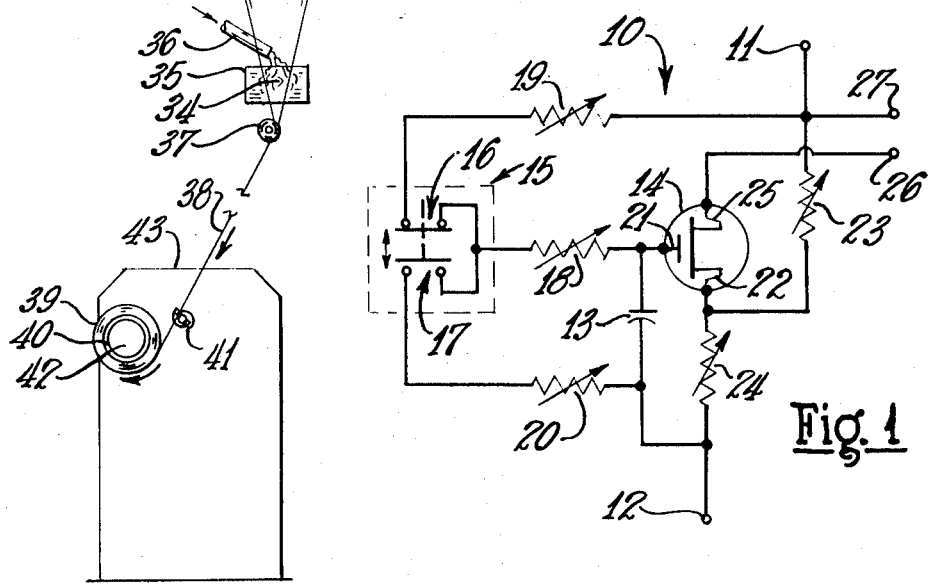
Fig. 2
Fig. 1
INVENTOR.
MELVIN R. COX
BY
Staelin & Overman
ATTORNEYS

— 3,634,699 —

CONDITION-RESPONSIVE CONTROL CIRCUIT

BACKGROUND OF THE INVENTION

This invention relates generally to apparatus for controlling a condition which may fall above, within or below a tolerance range, and more particularly to apparatus for controlling the level over a pool of molten glass which is constantly being replenished due to a continual extraction of glass in the form of fibers or filaments.

It is often desirable to maintain a given condition very close to or within a predetermined range of tolerances. Maintenance of the surface level of a pool of molten glass is exemplary of such a condition. It is, for example, well established that fibrous glass may be produced by flowing streams of molten glass from a plurality of orificed tips provided on the bottom side of a heated feeder or reservoir. The glass streams are attenuated, usually by mechanical means, into small diameter filaments which are ultimately gathered and processed into a variety of commercial products. In manufacturing glass filamentary products, especially yarns, strands, rovings and the like, it is imperative that strict control be exercised to maintain exact filament uniformity. The physical and structural characteristics of filaments produced by conventional orificed feeders depend largely on the condition of the molten glass within the feeder. Thus, accurate control over glass viscosity, temperature and head has been recognized to be a determinate factor in producing quality filaments. To avoid undesirable thermal gradients and resultant viscosity changes as well as variations in glass pressure head has required that molten feeder glass be maintained at a substantially constant or undeviating level, since a fluctuation in glass level radically affects filament consistency. The tolerances within which glass level must be held can be appreciated by the fact that filaments generally on the order of twenty-two one hundred thousandths of an inch in diameter must be controlled within one percent in order to meet production standards. Furthermore, difficulty in maintaining such finite control is compounded by the continuous supply and removal nature of the glass feeder operation.

In the past, feeder glass level has been maintained by using electrical probes to sense the glass level and to issue a correlative signal which is used by liquid flow controllers as a basis for compensating level deviations from a preset value. Some such probe circuits have typically established a control signal corresponding in magnitude to the glass level by employment of a probe design which causes a circuit resistance to vary in accordance with the depth at which the probe extends below the glass surface. Other circuits have relied upon multiple probes disposed at different elevations in the feeder to sense and provide flow regulators with contemporaneous level information. Where these prior art systems have been used extensively, they have been found to be expensive and to have certain other deficiencies which are especially noticeable during sustained periods of operation. One deficiency in prior art systems is a lack of memory circuit. The control signal at any given time is independent of earlier control signals. When there is a change in the rate at which glass is removed from the feeder, the control circuit commonly changes the oscillatory rate or hunting and the magnitude of the control signal. There is no gradual change in the base point or operating point of the control signal to compensate for such changes in the rate of glass consumption.

SUMMARY OF THE INVENTION

According to the present invention, a memory or control circuit has been developed for generating a control signal for maintaining a varying condition within or near a predetermined tolerance range. The control circuit includes a pair of switches: a first of the switches closes when the condition is below the tolerance range and the second of the switches closes when the condition is above the tolerance range. Closure of one of the switches connects a storage capacitor through a timer resistance to a direct current source for exponentially charging the capacitor. Closure of the other switch discharges the capacitor through a second timing resistance. When the condition is within the tolerance range, both switches are open and the charge on the capacitor remains substantially constant. The capacitor is connected to the high-impedance gate electrode of a field-effect transistor which generates a control signal which is a function of the charge on the capacitor.

When the control circuit is used for maintaining the level of molten glass in a feeder, one convenient device for actuating the two switches to charge and discharge the capacitor is through the use of a gaseous purged probe. A constant flow of gas is supplied to a hollow probe having a gas discharge end positioned below the glass surface in the feeder. Since the gas flow is constant, the gas pressure in the probe will be a function of the pressure head of glass above the discharge end of the probe. The two switches are pressure actuated and are mounted in a gas pressure sensor which is connected to the probe. When the glass level is within the predetermined tolerance range, the gas pressure holds both switches open. A deviation of the glass level below the tolerance range results in a drop in gas pressure which closes one switch, while a deviation of the glass level above the tolerance range results in an increase in gas pressure which closes the other switch.

Accordingly, it is a primary object of this invention to provide apparatus for generating a signal for controlling a condition which may deviate above or below a predetermined tolerance range.

Another object of the invention is the provision of liquid level control apparatus capable of detecting and maintaining liquid level within an extremely small range by virtue of ability to quickly respond to and correct slight deviations from a preselected tolerance range.

Still another object of the invention is to provide an exacting level control for a relatively high-temperature pool of liquid material, such as molten glass, which is constantly being replaced due to a continual withdrawal of the molten material.

Other objects and advantages of the invention will become apparent from the following detailed description, with reference being made to the accompanying drawings.

BRIEF DESCRIPTION OF THE DRAWINGS

FIG. 1 is a schematic circuit diagram of a memory control circuit according to the instant invention; and FIG. 2 is a diagram of apparatus for producing filaments from molten glass and including a memory control circuit according to the instant invention for maintaining the level of molten glass in an orificed filament feeder.

DESCRIPTION OF THE PREFERRED EMBODIMENTS

Referring now to FIG. 1, a detailed schematic circuit diagram is shown for a control circuit 10 constructed in accordance with the instant invention. The control circuit 10 is operated from a conventional DC voltage supply (not shown) which is connected between a positive terminal 11 and a negative terminal 12. The control circuit 10 generally comprises a storage capacitor 13 which functions as a memory device and an electronic valve, preferably a field-effect transistor 14. A condition sensor 15 is connected to selectively charge and discharge the capacitor 13 when the controlled condition is above or below a predetermined tolerance range.

The condition sensor 15 generally comprises a pair of switches 16 and 17. The switches 16 and 17 are connected such that one switch, for example switch 16, is closed when the condition deviates below the predetermined tolerance range and the other switch, switch 17 in this case, is closed when the condition deviates above the predetermined tolerance range. The sequence in which the switches 16 and 17 are closed is of course determined by the direction in which the control signal must vary when there is a deviation in the sensed condition. When the condition is within the predetermined tolerance range, both of the switches 16 and 17 are held open. The switches 16 and 17 may include either two separate and independent switches, two switches having interlocking contacts, or a single-pole double-throw switch having an intermediate open position. When the switch 16 is closed, the capacitor 13 is connected in series with the negative terminal 12, an adjustable resistor 18, an adjustable resistor 19 and the positive terminal 11. The capacitor 13 is then exponentially charged at a rate determined by the time constant of the capacitor 13 and the series resistors 18 and 19. When, on the other hand, the switch 17 is closed and the switch 16 is open, the capacitor 13 is discharged through the resistor 18 and a series-connected resistor 20. The discharge rate is determined by the time constant of the capacitor 13 and the two series resistors 18 and 20. The three resistors 18, 19 and 20 are variable to provide an accurate control over the charging and discharging rate of the capacitor 13. The common junction between the capacitor 13 and the resistor 18 is connected to the high-impedance gate electrode 21 of the field-effect transistor 14. The impedance of the gate electrode 21 is sufficiently high that the charge on the capacitor 13 remains substantially constant when the condition is within its predetermined tolerance range and both of the switches 16 and 17 are open.

The field-effect transistor 14 has a source electrode 22 which is connected through an adjustable resistor 23 to the positive terminal 11 and through a second adjustable resistor 24 to the negative terminal 12. The adjustable resistors 23 and 24 form a voltage divider for determining the operating point of the transistor 14. The resistor 23 is used in adjusting the zero point for the output voltage while the resistor 24 is used in adjusting the output voltage span. The field-effect transistor 14 has a drain electrode 25 which is connected directly to a negative output terminal 26. A positive output terminal 27 is connected directly to the positive DC voltage source terminal 11. When a load is connected to the control circuit 10, the output voltage appearing across the output terminals 26 and 27 will be a function of the voltage across the charged capacitor 13.

It will be apparent that the control circuit 10 may be used to generate a control signal for maintaining various types of conditions within or very close to a predetermined tolerance range. The control circuit 10 is particularly useful where the condition is dependent upon operating parameters which may vary, for example, in controlling liquid level in a reservoir wherein liquid must be supplied to the reservoir at a varying rate to compensate for a varying demand or withdrawal of liquid from the reservoir. The control circuit 10 supplies a varying DC control signal which hunts or varies about an average voltage or current, thus causing the condition to hunt close to the predetermined tolerance range. As the operating parameters vary, such as when the consumption rate of liquid from the reservoir changes or varies, the average value of the control signal will change accordingly.

Maintenance of an accurate surface level of a pool of molten glass in a bushing, reservoir or feeder for forming glass filaments is exemplary of the many uses of the control circuit 10. Referring now to FIG. 2, the control circuit 10 is shown embodied in glass fiber or filament-forming apparatus 30. Streams of molten glass are emitted through a plurality of orificed tips 31 depending from a bushing, reservoir or feeder 32 and are then attenuated into continuous fibers or filaments 33. A binder or sizing 34 is applied to the filaments 33 by an applicator roll 35 which is furnished with a metered quantity of the binder or sizing 34 by a conduit 36. Subsequently, the filaments 33 are gathered by a shoe 37 into a composite or strand 38 which is ultimately wound into a package 39 by a rotating tube 40. A spiral wire or traversing mechanism 41 is rotated against the strand 38 to distribute it reciprocally and longitudinally across the outer surface of the tube 40 as it rotates.

The tube 40 is removably mounted on a drum 42 supported by a winder 43 which, by employment of conventional driving means, causes the drum 42 and the tube 40 to rotate at an angular velocity sufficiently high enough to generate a suitable filament attenuation force. Normally, the filament attenuation occurs while pulling the strand at a linear speed within the range of 12,000 to 15,000 feet per minute.

Molten heat-softenable material 46, glass in this instance, is supplied to the feeder 32 in the form of a stream 47 emanating from an orificed premelter 48. The feeder 32 is preferably fabricated from a low-resistance metallic material, e.g., platinum, rhodium alloys, etc., capable of withstanding the high temperatures and abrasiveness of molten material such as molten glass. An alternating current is supplied from a power source 49 to a pair of terminals 50 and 51 on opposite ends of the feeder 32 as a means of resistively generating heat to retain the glass composition 46 at a desired relatively high viscosity. The power source 49 may typically be a 440-volt, 60-cycle source connected directly to the primary of a transformer 52 which reduces the supply voltage to a value on the order of 2 volts. Since the feeder 32 is fabricated from a low-resistance material, the feeder heating current will normally be on the order of one kiloampere or more.

The primary loop of the power circuit for the feeder 32 includes a saturable core reactor 53 which operates as a variable impedance for controlling the current delivered to the feeder 32. By controlling the magnitude of the current passing through the feeder 32, the amount of heat generated thereby and thus the viscosity of the molten material 46 may be correspondingly controlled. The saturable core reactor is cooperatively associated with a thermocouple 54 affixed to a side of the feeder 32 to generate an electrical signal corresponding to the feeder temperature. The thermocouple 54 is connected to an amplifier 55 which delivers an amplified temperature signal to a regulator 56. The regulator 56 in turn supplies a direct current control signal to the saturable reactor 53 to modify the impedance offered by the reactor in the primary loop of the feeder power circuit and to thus automatically maintain a fixed feeder temperature. When the temperature of the feeder rises above a preset value, the direct current supplied from the regulator 56 to the saturable core reactor 53 is reduced, thereby enlarging the impedance of the reactor 53 and diminishing the current supplied to the feeder 32. If on the other hand the temperature of the feeder 32 drops below the preselected value, the impedance of the regulator 56 decreases to supply additional direct current to the reactor 53, thereby reducing the reactor impedance and increasing the current flow to the feeder 32 for a rise in the feeder temperature. The feeder 32 is thus maintained at a relatively fixed temperature with the glass viscosity being substantially constant regardless of the rate of withdrawal of fibers 33 therefrom. The above-described feeder power control arrangement is virtually identical to that shown in Willis U.S. Pat. 3,012,373, but may be accomplished equally as well by using other systems such as the SCR arrangement shown and described in Trethway U.S. Pat. No. 3,246,126.

As heretofore pointed out, overall uniformity of glass temperature and viscosity is somewhat dependent on level control, with precise maintenance thereof being essential in order to produce high-quality glass filaments. Furthermore, as a direct function of level, the feeder glass head must be held in a substantially nondeviating fashion to insure filament production uniformity. In the feeder 32, the requisite control is accomplished by a system comprising a pneumatic level detector and the control circuit 10 which issues a control signal based on the detected surface level. A gaseous purged probe or conduit 57 is mounted adjacent to the exterior of the feeder 32 such that an emission end 58 of the probe 57 extends through the top of the feeder to an interior spot located beneath the surface of the molten material 46. A gas supply source 59, such as a tank of compressed air, is connected to the probe 57 by a conduit 60 in order to furnish the probe 57 with a desired flow of gas. The gaseous substance from the source 59 is supplied at a substantially constant flow rate by a pressure regulator 61 and a flow regulator 62 located in the conduit 60 between the source 59 and the probe 57. The gas pressure developed in the probe 57 is thus reflective of the depth to which the probe end 58 extends beneath the surface of the glass 46 in the feeder 32. By appropriate calibration, the pressure in the probe 57 may be taken as an indication of the molten glass level within the feeder 32. It appears that any would-be formation of glass crystalline structures at the discharge end 58 or on the exterior surface of the probe 57 is prohibited by a continuous movement of the gas.

To convert the gas pressure in the probe 57 to level information suitable for use by the control circuit 10, a conduit 65 tapped to the probe 57 is connected to the condition sensor 15, which in this instance is pressure sensitive. The sensor 15 is a commercially available pressure switch capable of sequentially operating electrical contacts in a manner based on the magnitude of the gas pressure sensed. As seen in FIG. 1, the sensor 15 may preferably be of a three-position, double-pole type. The switch 16 may be closed when the gas pressure in the probe 57 drops as a direct result of a drop in the glass surface level in the feeder 32 below a predetermined tolerance range. Similarly, the switch 17 may be closed when the pressure of the gas in the probe 57 increases as a result of the surface level of the glass 46 in the feeder 32 exceeding the predetermined tolerance range. When the surface level of the glass 46 in the feeder 32 is within the predetermined tolerance range, the gas pressure in the probe 57 holds both of the switches 16 and 17 open.

Referring again to FIG. 2, the electrical switching mechanism of the sensor 15 is connected to the control circuit 10, which is capable of producing a direct current control signal having a magnitude varying in response to each level detector switching condition. The control signal is amplified by an amplifier 66 for ultimate use in controlling the impedance of a saturable core reactor 67, which is located between an alternating current power source 68 and a transformer 69. The output of the transformer 69 is connected across a pair of terminals 70 and 71 on the heating unit 48 which premelts batch, marbles, or cullet 72, or a combination of these, to provide the feeder 32 with a constant supply of molten material 46. The transformer 69 is connected to reduce the voltage of the source 68, which may be on the order of 440 volts to a value of the order of 2 volts. Since the reactor 67 operates in a conventional manner such as that described above for the reactor 53, the amplified signal from the control circuit 10 serves to control the reactor impedance and consequently the resistive heating power applied by the premelter 48 to the glass material 46. Thus, the melting rate of the raw material 72, the flow rate of the stream 47 and the level of the molten material 46 in the feeder 32 are all dependent on the magnitude of the control signal issued by the control circuit 10. By this technique, the premelter 48 is made to function essentially as a means for controlling the volume of material flowing to the feeder 32.

While the control circuit 10 has been specifically described for maintaining the level of molten glass in an orificed feeder for forming fibers or filaments, it is not intended to limit the invention solely to this use. Numerous other possible uses for the control circuit are readily apparent. For example, the control circuit 10 of FIG. 1 can be used in an automatic pilot for maintaining an automobile at a preset speed. The memory capacitor 13 is either charged or discharged as the automobile deviates from the preset speed. The average voltage of the control signal will change to compensate for average load changes, such as when the automobile encounters a hill or incline, Thus, while a specific embodiment of the invention has been shown and described, it is evident that various modifications and changes can be made and that the control circuit can be used for various purposes without departing from the scope and spirit of the claimed invention.

What I claim is:

1. Apparatus for generating a signal for controlling a condition which may fall below, within or above a predetermined tolerance range comprising, in combination, a capacitor, means for exponentially charging said capacitor when the condition is out of tolerance in one direction, means for exponentially discharging said capacitor when the condition is out of tolerance in the other direction, the charge on said capacitor remaining substantially constant when the condition is within the tolerance range, and valve means having a high impedance gate terminal connected to said capacitor for generating a control signal which is a function of the charge on said capacitor.

2. Apparatus for generating a signal for controlling a condition, as defined in claim 1, wherein said valve means comprises a field-effect transistor having gate, source and drain electrodes, and means connecting said capacitor between said gate and said source electrodes, the control signal appearing between said source and said drain electrodes.

3. Apparatus for generating a signal for controlling a condition which may fall below, within or above a predetermined tolerance range comprising, in combination, first and second switches, means for closing said first switch when the condition is above the tolerance range, means for closing said second switch when the condition is below the tolerance range, said first and second switches both being open when the condition is within the tolerance range, a capacitor, means for exponentially charging said capacitor when one of said switches is closed, means for exponentially discharging said capacitor when the other of said switches is closed, the charge on said capacitor remaining substantially constant when both of said switches are open, and means for generating a control signal which is a function of the charge on said capacitor.

4. Apparatus for generating a signal for controlling a condition, as defined in claim 3, wherein said means for generating a control signal comprises a field-effect transistor having gate, source and drain electrodes, and means connecting said capacitor between said gate and said source electrodes, the control signal appearing between said source and said drain electrodes.

5. Apparatus for generating a signal for controlling a condition, as defined in claim 3, wherein said means for exponentially charging said capacitor includes a source of direct current, a resistor and means connecting said one switch, said source, said resistor and said capacitor in series, and wherein said means for exponentially discharging said capacitor includes a second resistor and means connecting said other switch, said second resistor and said capacitor in series.

6. Apparatus for generating a signal for controlling a condition, as defined in claim 5, wherein said means for generating a control signal comprises a field-effect transistor having gate, source and drain electrodes, and means connecting said capacitor between said gate and said source electrodes, the control signal appearing between said source and said drain electrodes.

7. In apparatus of forming glass filaments and including an orificed feeder for holding a pool of molten glass from which glass filaments are drawn and a glass premelter for delivering a stream of molten glass to the feeder, apparatus for controlling the surface level of the pool of molten glass in the feeder comprising, in combination, a capacitor, means for exponentially charging said capacitor when the surface level is out of a predetermined tolerance range in one direction, means for exponentially discharging said capacitor when the surface level is out of the tolerance range in an opposite direction, the charge on said capacitor remaining substantially constant when the surface level is within the predetermined tolerance range, valve means having a high-impedance gate terminal connected to said capacitor for generating a control signal which is a function of the charge on said capacitor, and means responsive to such control signal for controlling the stream of molten glass from the premelter to the feeder.

8. Apparatus for controlling the surface level of a pool of molten glass in an orificed feeder for forming glass filaments, as defined in claim 7, wherein said means for exponentially charging said capacitor includes a first switch, a resistor, a source of direct current, means connecting said first switch, and said source, said resistor and said capacitor in series, and means for closing said first switch when the surface level is out of tolerance in the one direction, and wherein said means for exponentially discharging said capacitor includes a second switch, a second resistor, means connecting said second switch, said second resistor and said capacitor in series, and means for closing said second switch when the surface level is out of tolerance in the opposite direction.

9. Apparatus for controlling the surface level of a pool of molten glass in an orificed feeder for forming glass filaments, as defined in claim 8, wherein said valve means for generating a control signal comprises a field-effect transistor having gate, source and drain electrodes, and means connecting said capacitor between said gate and said source electrodes, the control signal appearing between said source and said drain electrodes.

10. Apparatus for controlling the surface level of a pool of molten glass in an orificed feeder for forming glass filaments, as defined in claim 8, wherein said means for controlling the stream of molten glass from the premelter to the feeder comprises means for electrically heating said premelter, and means responsive to such control signal for increasing current to said electrically heating means when the surface level is below the predetermined tolerance range and for decreasing current to said electrical heating means when the surface level is above the predetermined tolerance range.

11. Apparatus for controlling the surface level of a pool of molten glass in an orificed feeder for forming glass filaments, as defined in claim 8, wherein said first switch is pressure responsive and is closed when an applied pressure exceeds a first predetermined pressure, said second switch is pressure responsive and is closed when an applied pressure is below a second predetermined pressure less than said first pressure, and wherein said means for closing said first switch and said means for closing said second switch comprises a hollow probe having a gas discharge end positioned within the feeder below the surface of the pool of molten glass, means for supplying a constant flow of gas to said probe, the pressure of such gas varying with the surface level of the pool of molten glass, and means for applying the gas pressure to said first and second switches.

12. Apparatus for controlling the surface level of a pool of molten glass in an orificed feeder for forming glass filaments, as defined in claim 8, wherein said first switch is pressure responsive and is closed when an applied pressure is below a first predetermined pressure, said second switch is pressure responsive and is closed when an applied pressure exceeds a second pressure greater than said first pressure, and wherein said means for closing said first switch and said means for closing said second switch comprises a hollow probe having a gas discharge end positioned within the feeder below the surface of the pool of molten glass, means for supplying a constant flow of gas to said probe, the pressure of such gas varying with the surface level of the pool of molten glass, and means for applying the gas pressure to said first and second switches.

13. Apparatus for controlling the surface level of a pool of liquid in a container as liquid is removed from the container comprising, in combination, a capacitor, means for exponentially charging said capacitor when the liquid surface level is out of a predetermined tolerance range in one direction, means for exponentially discharging said capacitor when the liquid surface level is out of the tolerance range in an opposite direction, the charge on said capacitor remaining substantially constant when the surface level is within the predetermined tolerance range, valve means having a high-impedance gate terminal connected to said capacitor for generating a control signal which is a function of the charge on said capacitor, and means responsive to such control signal for supplying additional liquid to the container.

14. Apparatus for controlling the surface level of a pool of liquid in a container, as defined in claim 13, wherein said means for exponentially charging said capacitor includes a first switch, a resistor, a source of direct current, means connecting said first switch, said source, said resistor and said capacitor in series, and means for closing said first switch when the surface level is out of tolerance in the one direction; wherein said means for exponentially discharging said capacitor includes a second switch, a second resistor, means connecting said second switch, said second resistor and said capacitor in series, and means for closing said second switch when the surface level is out of tolerance in the opposite direction; and wherein said valve means comprises a field effect transistor.

15. Apparatus for generating a signal for controlling a condition which may fall below, within or above a predetermined tolerance range comprising, in combination, an energy storage device, means for increasing the energy stored in said device when the condition is out of tolerance in one direction, means for decreasing the energy stored in said device when the condition is out of tolerance in the other direction, the stored energy in said device remaining substantially constant when the condition is within the tolerance range, and means connected to said energy storage device for generating a control signal which is a function of the energy stored in said device.

16. Apparatus for controlling the surface level of a pool of liquid in a container as liquid is removed from the container comprising, in combination, an energy storage device, means for increasing the energy stored in said device when the surface level is out of a predetermined tolerance range in one direction, means for decreasing the energy stored in said device when the surface level is out of the tolerance range in the other direction, the stored energy in said device remaining substantially constant when the surface level is within the tolerance range, means connected to said energy storage device for generating a control signal which is a function of the energy stored in said device, and means responsive to the control signal for supplying additional liquid to the container.

17. Apparatus for controlling the surface level of a pool of molten glass in a container as molten glass is continuously removed from the container compromising, in combination, an energy storage device, means for increasing the energy stored in said device when the surface level is out of a predetermined tolerance range in one direction, means for decreasing the energy stored in said device when the surface level is out of the tolerance range in the other direction, the stored energy in said device remaining substantially constant when the surface level is within the tolerance range, means connected to said energy storage device for generating a control signal which is a function of the energy stored in said device, and means responsive to the control signal for supplying additional glass to the container.

18. Apparatus for controlling the surface level of a pool of molten glass in a container, as defined in claim 17, wherein said energy storage device is a capacitor, and wherein said means for generating a control signal includes a field effect transistor having a high impedance gate terminal connected to said capacitor.

* * * * *